United States Patent
Macura et al.

(10) Patent No.: US 7,634,394 B2
(45) Date of Patent: Dec. 15, 2009

(54) METHOD OF ANALYSIS OF COMFORT FOR VIRTUAL PROTOTYPING SYSTEM

(75) Inventors: Matthew Joseph Macura, Mariemont, OH (US); Bryan Keith Feller, Wyoming, OH (US); Noble Lester Rye, II, Liberty Township, OH (US); Luke Hwang, West Chester, OH (US); John Matthew Anast, Fairfield, OH (US); Marianne Elizabeth Brunner, Cincinnati, OH (US); Tana Marie Kirkbride, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 234 days.

(21) Appl. No.: 11/072,152

(22) Filed: Mar. 4, 2005

(65) Prior Publication Data

US 2005/0264563 A1    Dec. 1, 2005

Related U.S. Application Data

(60) Provisional application No. 60/550,479, filed on Mar. 5, 2004, provisional application No. 60/550,490, filed on Mar. 5, 2004.

(51) Int. Cl.
G06F 17/10    (2006.01)
G06G 7/48    (2006.01)

(52) U.S. Cl. ............................................... 703/6; 703/2
(58) Field of Classification Search .................. 703/2, 703/6
See application file for complete search history.

(56) References Cited

U.S. PATENT DOCUMENTS 5,625,577 A    4/1997  Kunii (Continued)

FOREIGN PATENT DOCUMENTS

EP    1 221 674 A2    7/2002

(Continued)

OTHER PUBLICATIONS

Li et al.; Integrated CAD for functional textiles and apparel; Proceedings of Nokobetef, held May 2000; pp. 8-11.*

(Continued)

*Primary Examiner*—Hugh Jones
(74) *Attorney, Agent, or Firm*—James E. Oehlenschlager; Gary J. Foose; Roddy M. Bullock

(57) ABSTRACT

A method for analyzing the comfort of an actual product on an actual body by use of a virtual product model and virtual body model to calculate a comfort indicator. The method comprises the steps of: (a) providing a virtual body model; (b) providing a virtual product model; (c) providing virtual simulation software; (d) gathering data from actual users of an actual product of a type modeled by the virtual product model; (e) running a virtual simulation for the virtual product model worn on the virtual body model; (f) running a virtual simulation for the virtual body model in the absence of the virtual product model; (g) calculating a difference in deformation on the virtual body model between the virtual simulations; and (h) correlating the calculated difference to the gathered data to determine a magnitude difference, the magnitude difference being the comfort indicator.

9 Claims, 11 Drawing Sheets

U.S. PATENT DOCUMENTS

| | | |
|---|---|---|
| 6,310,619 B1 | 10/2001 | Rice |
| 6,310,627 B1 | 10/2001 | Sakaguchi |
| 6,404,426 B1 | 6/2002 | Weaver |
| 2001/0026272 A1 | 10/2001 | Feld |
| 2004/0236455 A1 | 11/2004 | Woltman |
| 2004/0236456 A1 | 11/2004 | Pieper |
| 2004/0236457 A1 | 11/2004 | Stabelfeldt |

FOREIGN PATENT DOCUMENTS

| | | |
|---|---|---|
| WO | WO 00/59581 A1 | 10/2000 |
| WO | WO 01/01235 A1 | 1/2001 |
| WO | WO 01/35342 A1 | 5/2001 |
| WO | WO 01/64106 A1 | 9/2001 |
| WO | WO 02/29758 A2 | 4/2002 |

OTHER PUBLICATIONS

Li Y et al: "A 3D Biomechanical Model for Numerical Simulation of Dynamic Mechanical Interactions of Bra and Breast During Wear", SEN'I GAKKAISHI 2003, vol. 59, No. 1, pp. 12-21.

Goonetilleke Ravindra S. et al.: "The Quality of Footwear Fit: What we know, don't know and should know", Proc. Triennial Congr. Internat. Ergon. Ass. Ann. Meeting Hum. Factors Ergon. Assoc.; Proceedings of the Sivth Triennial Congress of the International Ergonomics Association and 44th Annual Meeting of the Human Factors and Ergonomics Association, ' ER, 2000, pp. 515-518.

Zhang X. et al.: "Numerical Simulation of 3D Dynamic Garment Pressure", Textile Research Journal, Sage Publications, London, GB, vol. 72, No. 3, Mar. 2002, pp. 245-252.

PCT International Search Report dated Aug. 19, 2005.

David Baraff, Partitioned Dynamics, The Robotics Institute, Mar. 1997.

Fred S. Azar, A Deformable Finite Element Model of the Breast for Predicting Mechanical Deformations under External Perturbations, 2001.

C.W.J.Oomens Deformation Analysis of a Supported Buttock Contact, BED-vol. 50, 2001.

Pascal Vollino, Versatile and Efficient Techniques for Simulating Cloth and Other Deformable Objects, Miralab 1998.

David E. Breen, Predicting the Drape of Woven Cloth Using Interacting Particles, ECRC-94-16.

Fabio Ganovelli, Indroducing Multiresolution Representation in Deformable Object Modeling.

Donald H. House, Towards Simulating Cloth Dynamics Using Interacting Particles, ECRC Feb. 7, 1996.

David E. Breen, A Particle-Based Model for Simulating the Draping Behavior of Woven Cloth, ECRC-94-19.

* cited by examiner

METHOD OF ANALYSIS OF COMFORT FOR VIRTUAL PROTOTYPING SYSTEM

CROSS REFERENCE TO RELATED APPLICATION

This application claims the benefit of U.S. Provisional Application No. 60/550,479, filed Mar. 5, 2004 and U.S. Provisional Application No. 60/550,490 filed Mar. 5, 2004.

FIELD OF THE INVENTION

The present invention relates to three-dimensional computer-aided modeling and design of garments to be worn on a body.

BACKGROUND OF THE INVENTION

Computer simulations of motion, e.g., using FEA, have long been used to model and predict the behavior of systems, particularly dynamic systems. Such systems utilize mathematical formulations to calculate structural volumes under various conditions based on fundamental physical properties. Various methods are known to convert a known physical object into a grid, or mesh, for performing finite element analysis, and various methods are known for calculating interfacial properties, such as stress and strain, at the intersection of two or more modeled physical objects.

Use of computer simulations such as computer aided modeling in the field of garment fit analysis is known. Typically, the modeling involves creating a three-dimensional (hereinafter "3D") representation of the body, such as a woman, and a garment, such as a woman's dress, and virtually representing a state of the garment when the garment is actually put on the body. Such systems typically rely on geometry considerations, and do not take into account basic physical laws. One such system is shown in U.S. Pat. No. 6,310,627, issued to Sakaguchi on Oct. 30, 2001.

Another field in which 3D modeling of a human body is utilized is the field of medical device development. In such modeling systems, geometry generators and mesh generators can be used to form a virtual geometric model of an anatomical feature and a geometric model of a candidate medical device. Virtual manipulation of the modeled features can be output to stress/strain analyzers for evaluation. Such a system and method are disclosed in WO 02/29758, published Apr. 11, 2002 in the names of Whirley, et al.

Further, U.S. Pat. No. 6,310,619, issued to Rice on Oct. 30, 2001, discloses a three-dimensional, virtual reality, tissue specific model of a human or animal body which provides a high level of user-interactivity.

The problem remains, however, how to model fit of a garment in both static and dynamic conditions while calculating physics-based deformations of either the body or the garment and analyzing the comfort of a product on a body. The problem is complicated more when two deformable surfaces are interacted, such as when a soft, deformable garment is in contact with soft, deformable skin.

Further, there is a need to model fit and comfort of a specific garment feature in a virtual environment in both static and dynamic conditions while calculating physics-based deformations of either the body or the garment.

Further, there remains a need for a system or method capable of modeling comfort with respect to specific product features of a soft, deformable garment, particularly while worn on a soft deformable body consistent with fundamental laws of physics.

Further, there remains a need for a system or method capable of modeling comfort for soft, deformable garment features, particularly while worn on a soft deformable body under dynamic conditions, such as walking or the act of sitting that simulates real stress/strain behavior.

Finally, there remains a need for a system or method capable of modeling soft, deformable garment features, particularly while worn on a soft deformable body under dynamic conditions that is not overly computer-time intensive; that is, it does not require such time and computing capability as to make it effectively un-usable for routine design tasks.

SUMMARY OF THE INVENTION

A method for analyzing the comfort of an actual product on an actual body by use of a virtual product model and virtual body model to calculate a comfort indicator is disclosed. The method comprises the steps of: (a) providing a virtual body model; (b) providing a virtual product model; (c) providing virtual simulation software; (d) gathering data from actual users of an actual product of a type modeled by the virtual product model; (e) running a virtual simulation for the virtual product model worn on the virtual body model; (f) running a virtual simulation for the virtual body model in the absence of the virtual product model; (g) calculating a difference in deformation on the virtual body model between the virtual simulations; and (h) correlating the calculated difference to the gathered data to determine a magnitude difference, the magnitude difference being the comfort indicator.

DETAILED DESCRIPTION OF THE INVENTION

The virtual model of the present invention can be used to virtually model the dynamic behavior of a body, such as a human body, and the body's interaction with garments. As used herein, the term "garments" means any article or object intended for placement on or in the body and intended for temporary wear. Therefore, the term garments includes externally-worn articles, such as clothing including hats, gloves, belts, shirts, pants, skirts, dresses and the like. The term garments also includes internally-worn articles such as earplugs, hearing aids, mouth guards, and tampons. Internally-worn articles generally have externally-disposed access means for placement and removable, such as finger extensions on earplugs and strings on tampons. Some garments can be partially external and partially internal, such as earrings in pierced ears, hearing aids having externally-disposed portions, and interlabially-placed catamenial devices.

It is believed that the method and system of the present invention is best suited for designing garments intended for close body contact, such as shoes, gloves, brassieres and other intimate garments. In a preferred embodiment of the present invention a three-dimensional, virtual body is utilized to model the crotch region of a human woman and a sanitary napkin garment. The invention is not limited to such a person or garment, however, and it may be used for modeling the interaction of any garment/body interface, particularly under dynamic conditions. In the present invention, whether externally-worn, internally-worn, or a combination thereof, virtual modeling is used to simulate wear based on fundamental physical laws.

Figure 1:
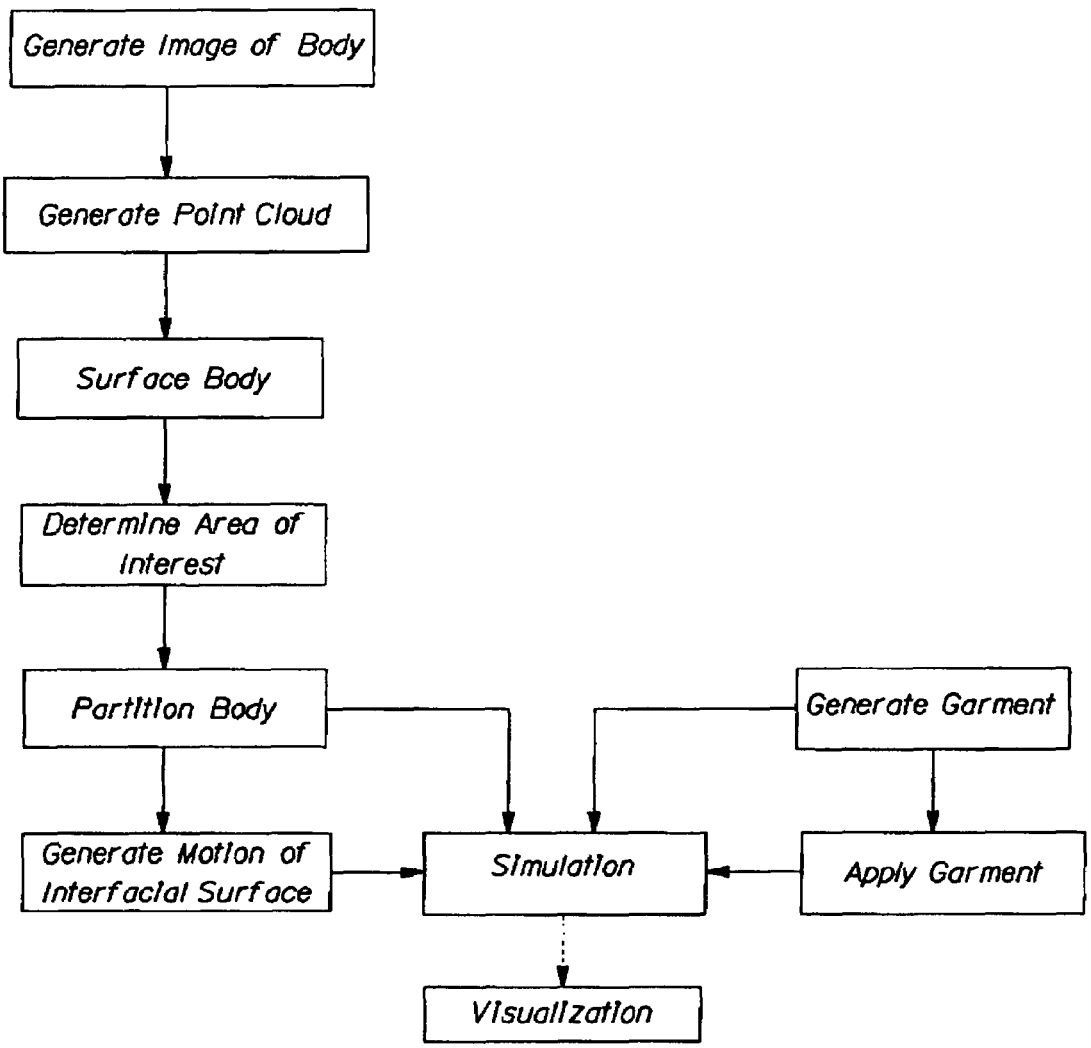
FIG. 1 is a flow chart depicting schematically one embodiment of a system of the present invention.

The invention can be understood by following the steps discussed below in conjunction with the flowchart in FIG. 1. The flowchart of FIG. 1 depicts elements associated with the virtual model of the invention, starting with the step of generating an image of a body, or a portion of a body to be surfaced. Surfacing is a technique for rendering a computer generated three-dimensional (3D) image of an actual 3D object. In one embodiment the portion of the body to be surfaced is the waist region of a human, including the crotch area and pudendal region, of an adult female. In another embodiment, the waist region is the waist region of an infant, useful for modeling disposable diapers. If the model is to be used to model a garment, the surfaced portion of the body includes that which is to be modeled with a garment.

Surfacing of a body can be achieved by means known in the art, such as by imaging the external surface of a portion of a body by making a series of images of the desired portion of the body using surface digital imaging techniques. However, in a preferred embodiment, surfacing of portions of a human body can be achieved by imaging techniques that also capture internal portions, such as magnetic resonance imaging (MRI). Other techniques for obtaining suitable images for surfacing could be used, such as ultrasound imaging or x-ray imaging, but MRI scans have been found to be preferred in the present invention.

The resolution of the MRI images will determine the level of detail available for analysis of fit. Therefore, the MRI scan should have sufficient resolution, including a sufficient number of "slices," to capture anatomical features relevant to fit and comfort for the garment being modeled. The term "slices" is used in its ordinary sense with respect to MRI scans, and denotes the two-dimensional images produced by MRI imaging. In one embodiment, coronal slices of the waist region of an adult female were imaged with a 2 mm (1:1 scale) increment resolution using a GE Medical Systems Genesis Sigma 1.5 Echo Speed LX MRI unit. The data output can be a series of DICOM image files that can be exported for further evaluation and analysis. The DICOM image files can have multiple regions corresponding to various components or tissues of the body. For example, each slice of an MRI image may show regions of fat, skin, muscle, bone, internal organs, and the like. For the purposes of the preferred embodiment of a sanitary napkin, the regions of skin, fat and muscle in the pudendal region are of the most interest.

A point cloud representation can be made from the DICOM image files. On each slice of MRI images, the various regions, and the interface between regions can be located and designated by a series of points which can be identified and designated by either the software or manually by the user. The points so designated create a point cloud representation of each slice of MRI image. The number, concentration, and spacing of the points can be chosen to get sufficient resolution for the body portion being modeled, such as sufficient resolution to capture the undulations of tissues, e.g., the skin, in the various regions. In general, the number of points and their spacing should be such that relevant body portions are accurately represented to a sufficient resolution relevant to fit and comfort. In one embodiment, a distance of about 2 mm (1:1 scale) between points of the point cloud was found to provide sufficient resolution for analyzing fit and comfort of a garment worn on a body.

Figure 2:
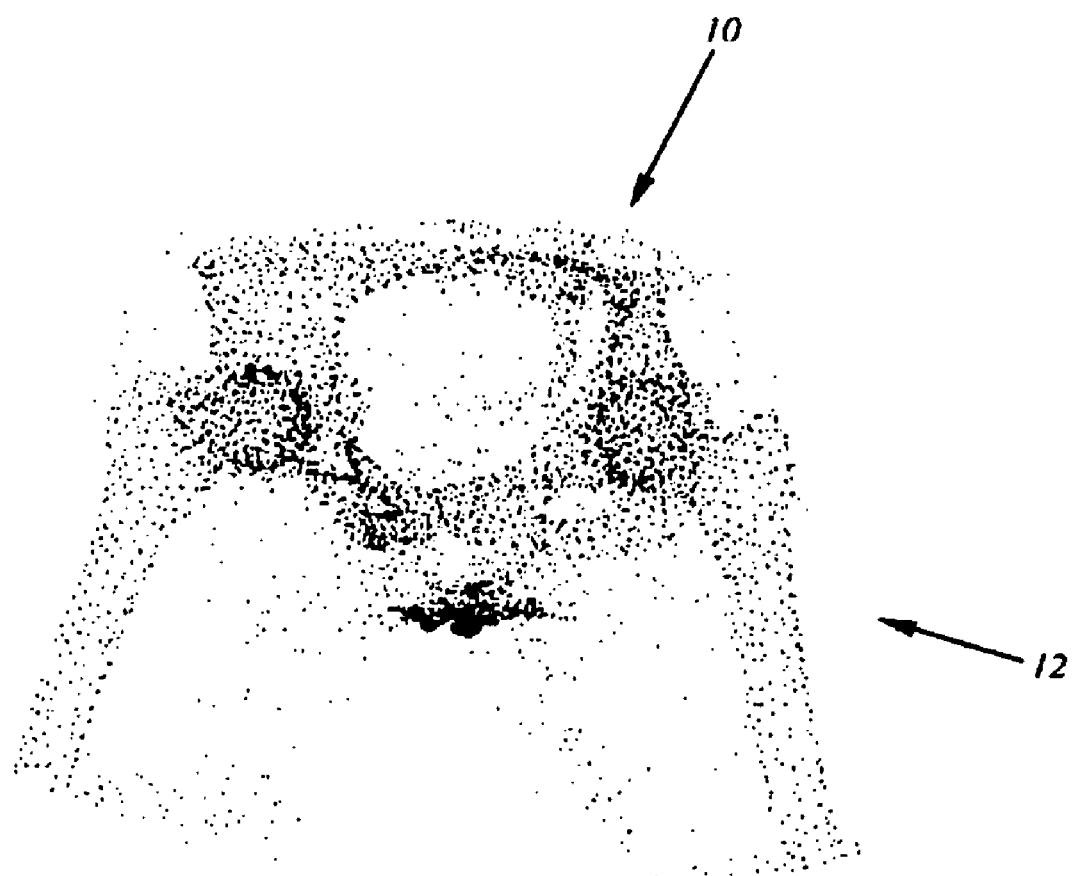
FIG. 2 is a depiction of a point cloud.

Once the points on each two-dimensional MRI slice are placed, software, such as the sliceOmatic® software referred to above, can generate a three-dimensional point cloud based on the relative position of the MRI slices. Once the three-dimensional point cloud is obtained, the data can be stored in electronic format in a variety of file types. For example, the point cloud can include a polygonal mesh in which the points are connected and the point cloud can be saved as a polygonal mesh file, such as a stereolithography file, that can be exported for further evaluation and analysis. An example of a visual rendering of a 3D point cloud 12 for the waist and crotch region 10 of a human female is shown in FIG. 2.

The point cloud of the body portion can then be surfaced by utilizing suitable software, including most computer aided design (CAD) software packages, such as, for example, Geomagic® available from Raindrop Geomagic (Research Triangle Park, N.C.). Surfacing can also be achieved by any of various means known in the art, including manually, if desired. In a preferred embodiment particular regions of the body can be surfaced, such as the interface between fat and muscle, fat and skin, and/or muscle and bone.

Once the body portion of interest is surfaced, the specific body portion of interest to be modeled is determined. For example, when modeling sanitary napkin garments, the body portion surfaced may be the entire waist and crotch region of an adult female, while the body portion of interest to be modeled is the pudendal region. The body portion of interest to be modeled is the portion of the body in which deformations are to be measured to model comfort and fit.

After determining the body portion of interest to be modeled, the surfaced portion can be arbitrarily partitioned into at least two volumes to isolate in one volume the body portion of interest to be modeled, i.e., portion of the body that is to remain deformable during modeling based on physics-based criteria. The remainder of the surfaced volume can simply be modeled by prescribed motion, thereby conserving resources in computing time. In a preferred embodiment, the surfaced body is partitioned into two separate, non-intersecting volumes, including at least a first deformable volume, and at least a second a prescribed motion volume. By "deformable volume" is meant a volume in which, when the simulation is performed, e.g., via finite element analysis (FEA), physical behavior, e.g., stress, deformation and motion, are computed. Conversely, by "prescribed motion volume" is meant a volume in which the deformations and motions are dictated by input to the simulation, and are not computational outputs of the simulation. In another embodiment, the surfaced portion of the body portion of interest can be a single volume, representing multiple structures of the body, for example skin, fat, and muscle. This entire volume remains deformable during modeling based on physics-based criteria. One or more surfaces of the volume may be prescribed a motion by input to the simulation and the remaining surface's and the volume's physical behavior is computed.

The prescribed motion volume is used to ensure realistic garment fit and positioning, but otherwise can have little impact on the physics-based analysis of body fit and comfort for the garment under evaluation. That is, the prescribed motion volume represents areas in which the garment may or may not interact with the wearer, or, where interaction is of lesser interest for a particular fit analysis. In general, the extent of the prescribed motion volume, and, likewise, the deformable volume, can be varied to obtain optimum results, depending on the specific garment being analyzed. For example, in the preferred embodiment of a sanitary napkin, the portion of the body corresponding to the pudendal region of a female, including interior anatomical features, can be rendered deformable as one volume, while the remaining portions of the body are rendered as a separate, non-deformable volume.

By "non-intersecting" with respect to the two volumes of the preferred embodiment is meant that the volumes do not overlap, i.e., no portion of the modeled body consists of both the deformable volume and the prescribed motion volume, but the two volumes are distinctly partitioned. In one embodiment, only the deformable volume need be determined, and then, by definition, the remainder of the body portion to be modeled represents the prescribed motion volume. The two volumes can share a common surface interface, which is all or a portion of their respective surfaces shared between the two volumes.

Figure 3:
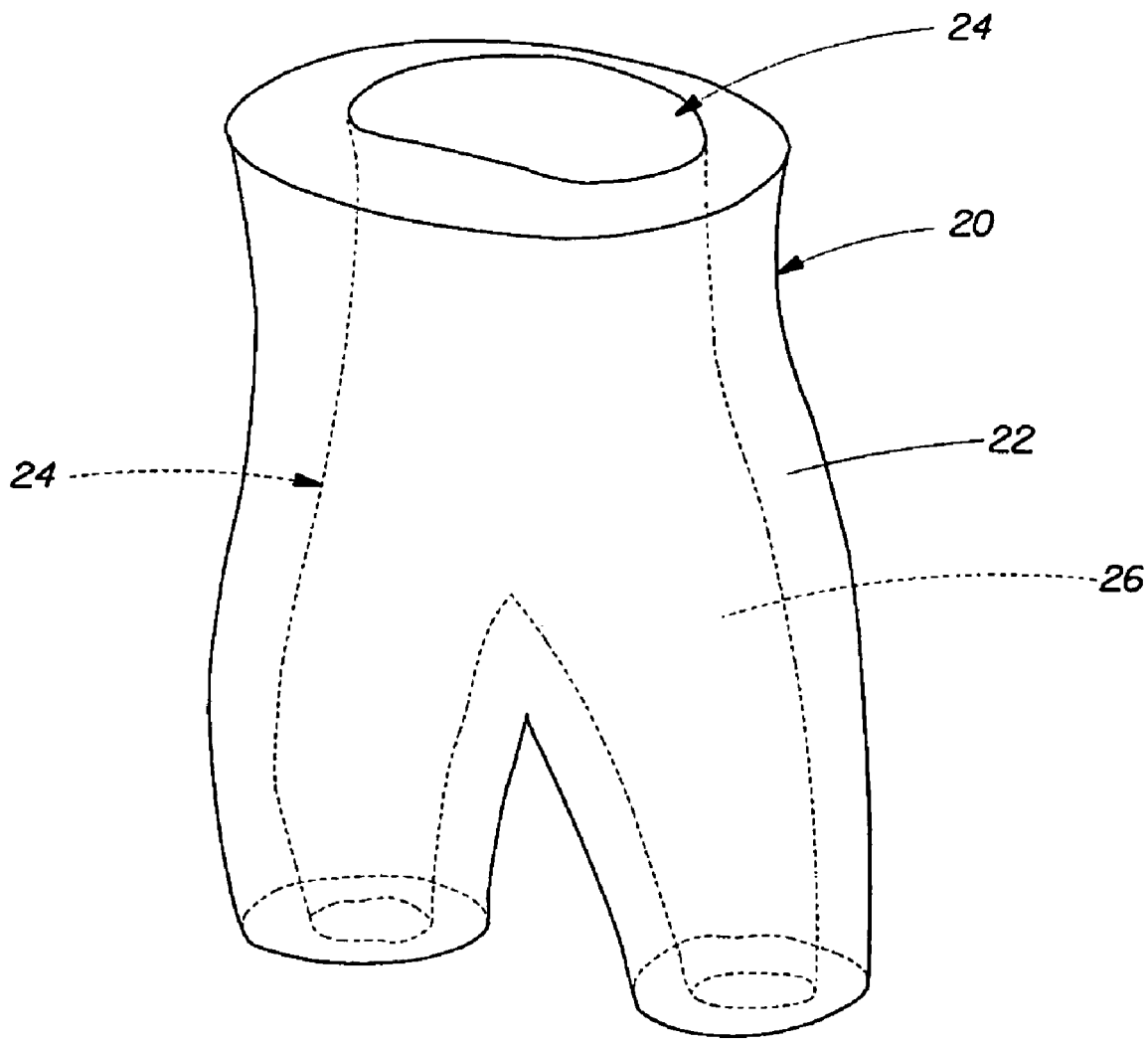
FIG. 3 is a schematic representation of two defined volumes.

As shown in FIG. 3, interfacial surface 24 can be fully interior to the surfaced body portion 12, i.e., a surface defined as being a certain distance "in," so to speak, from the external surface 20. The distance "in" should be great enough so as to allow for the external surface 20 to be deformable when modeled. Further, the interfacial surface should be in sufficient proximity to the external surface so as to be capable of driving motion of at least a portion of the external surface. In the embodiment shown in FIG. 3, interfacial surface 24 defines prescribed motion volume 26 which is "inside" deformable volume 22 and forms no part of the external surface 20 except at the cross-sections of the body portion 12.

Figure 4:
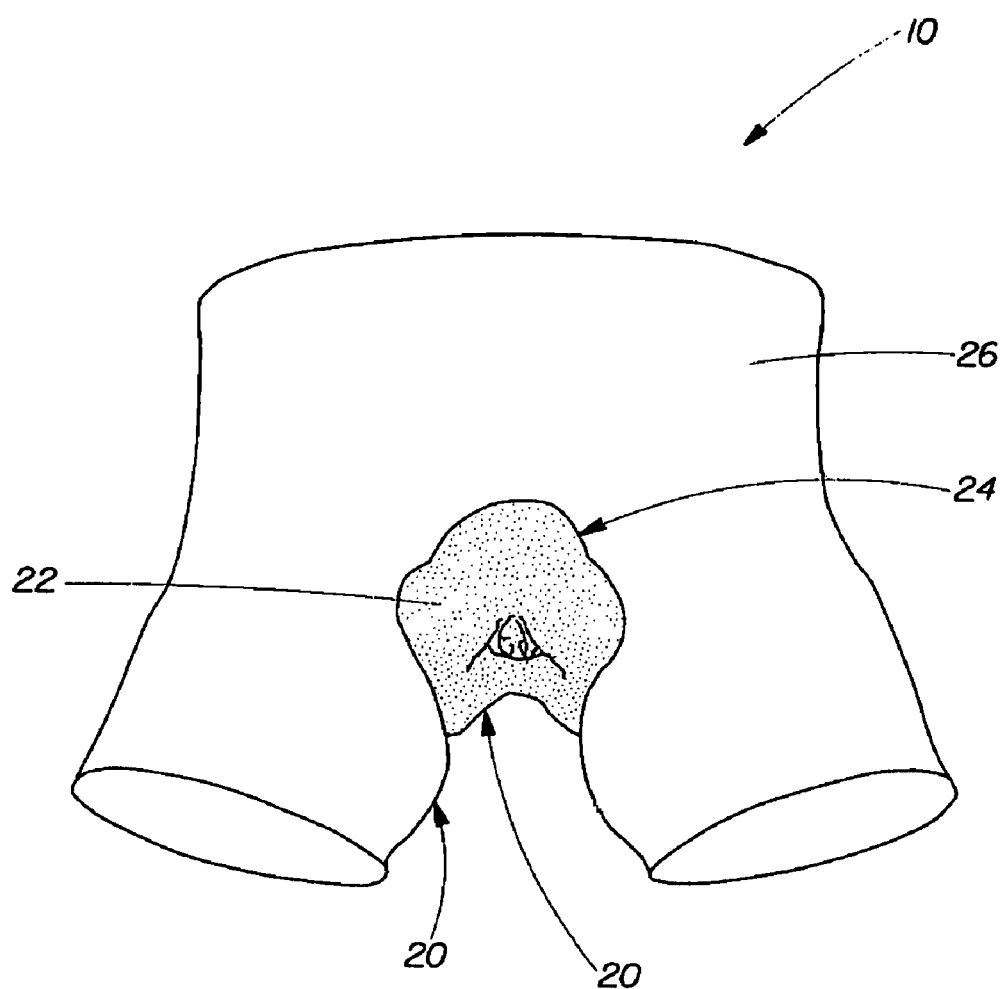
FIG. 4 is another schematic representation of two defined volumes.

As shown in FIG. 4, interfacial surface 24 can extend to and be partially bounded by a portion of the external surface 20. In FIG. 4, deformable volume 22 and prescribed motion volume 26 meet at interfacial surface 24 that extends to external surface 20. FIG. 4 shows two volumes that have been found to be useful for modeling feminine hygiene devices, such as sanitary napkins. As shown, a deformable volume 22 corresponds to the body portion of interest to be modeled, in this case the pudendal region of an adult female for evaluation of a sanitary napkin garment. Likewise, a prescribed motion volume 26 corresponds to the portions of the body not of interest for comfort and fit of the sanitary napkin, but helpful to understand and simulate overall body movement.

After partitioning into volumes is complete, the surfaced and partitioned body portion(s) can be meshed. From the surfacing software, such as Geomagic®, the surfaces can be imported into software capable of rendering the surfaces in three dimensions, such as I-DEAS® available from UGSPLM Solutions, a subsidiary of Electronic Data Systems Corporation (Plano, Tex.), through an IGES file format. Using I-DEAS®, the surfaces are used to generate 3D renderings defining corresponding separate components corresponding to the tissues in the portions of the body to be analyzed, for example the fat, muscle, and bone. To generate these 3D renderings, the technique of volume rendering from surfaces can be used as is commonly known in the art.

Figure 5:
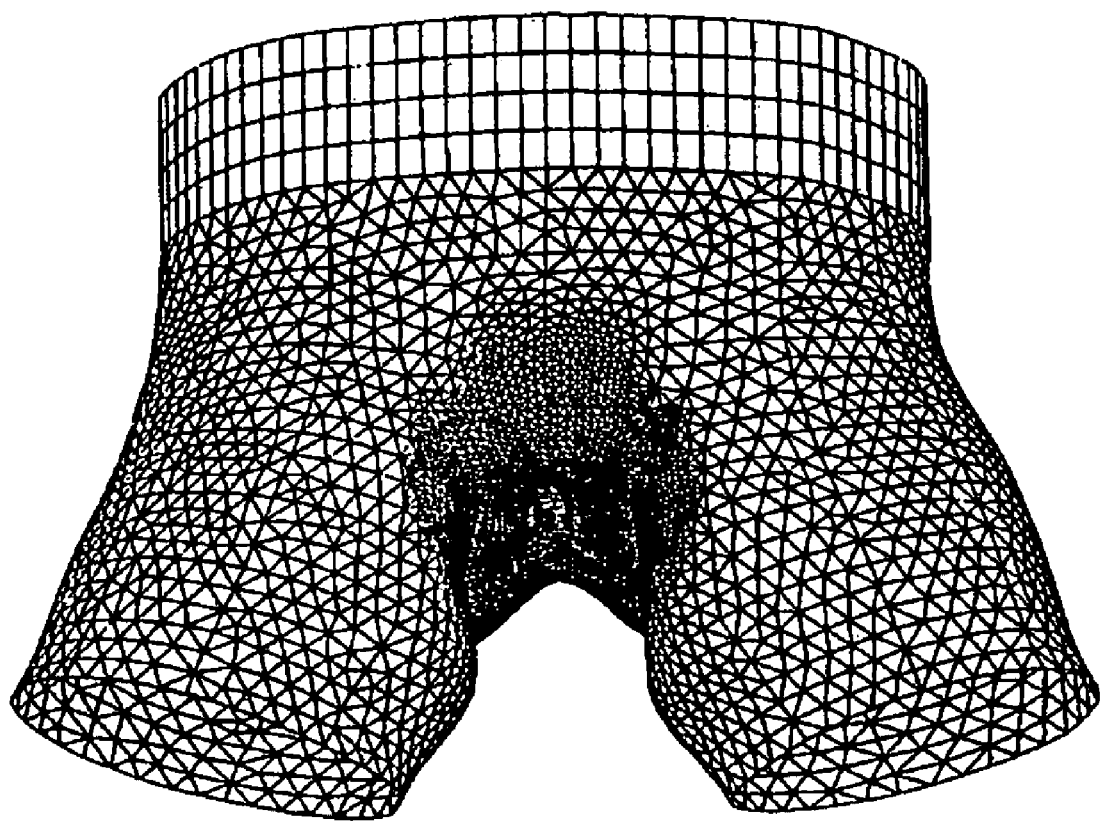
FIG. 5 is a meshed, three-dimensional model of a portion of a body.

The defined volumes can be meshed separately into a mesh of nodes and elements by means known in the art. For example, meshes can be created containing solid elements, shell elements, or beam elements. In a preferred method of the present invention, the deformable volume is meshed as solid elements as shown in FIG. 5. Various tissues within the deformable volume, such as fat tissues, muscle tissues, and the like can be meshed into separate parts, and each part can have appropriate material properties assigned to it, while maintaining the continuity of the mesh. As shown in FIG. 5, the body portion of interest, which is generally part of the deformable volume, can be meshed with a greater density of nodes and elements.

The prescribed motion volume may be meshed as shell elements or solid elements, or no mesh at all, at least in some portions. The prescribed motion volume need only be meshed sufficiently to enable realistic garment positioning, in both static and dynamic conditions. Having the two volumes with different mesh properties allows for a significant reduction in the number of nodes and elements necessary to simulate the body portion of interest. Those skilled in the art will recognize that minimizing the number of nodes and elements directly correlates with reducing the cost of the simulation.

To do motion simulation and fit modeling it is necessary that motion of the body portion being modeled be driven, i.e., moved through space in time. In the present invention, motion is driven by driving at least portions of the interfacial surface. Since the deformable volume is subject to physics based constraints, driving the interfacial surface in turn drives motion of the deformable volume that is free to move and deform, with the deformations producing measurable stress and strain. The prescribed motion volume, as its name suggests, follows motion curves consistent with the motion of the interfacial surface.

The measurable stress and strain can be due to contact with the garment being modeled. Moreover, a series of garments can be tested in sequence by using the same partitioned body portion, thereby enabling multiple garments to be relatively quickly tested for fit or comfort.

The interfacial surface is driven along predetermined motion curves in space and time. The predetermined motion curves can be generated by use of external motion capture or by manually selecting and inputting a series of points in space and time. In another embodiment, the predetermined motion curves are produced from kinematic animations using animation software, for example Maya® from Alias Wavefront. In a kinematic animation a kinematic skeleton can be created and attached to the interfacial surface. The user can then prescribe the motion of the kinematic skeleton through time. The animation software uses the prescribed kinematic motion to drive the motion of the interfacial surface. Finally, the time dependent motion can be exported for all or a portion of the nodes on the interfacial surface. That is, the motion curves can be assigned to only portions of the interfacial surface.

The garment to be evaluated in the virtual model of the present invention can be generated by producing a computer aided design (CAD) geometry of the actual garment of interest. CAD geometries can be produced from CAD drawings, as is known in the art. Once the CAD geometry is produced, it can be meshed into a mesh of nodes and elements by means known in the art. The number of nodes and elements can be varied as necessary or desired for adequate garment modeling.

Figure 6:
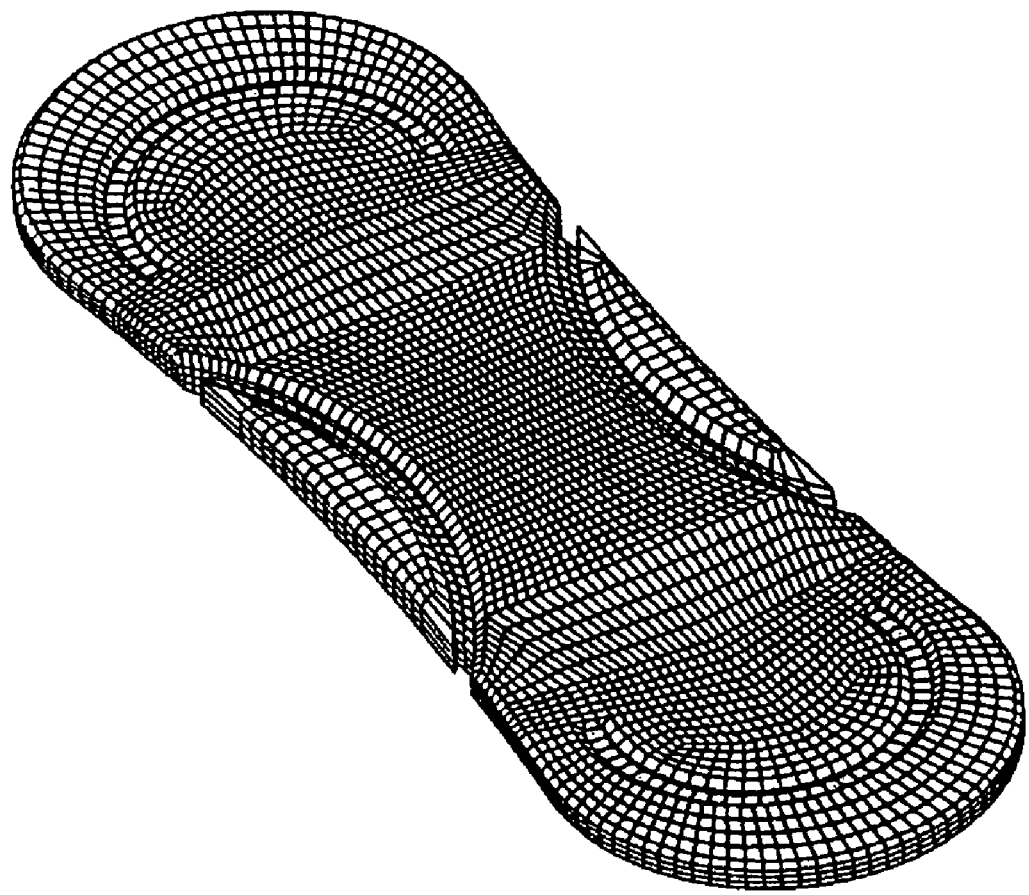
FIG. 6 is a meshed, three-dimensional model of a garment to be virtually prototyped by the system and method of the present invention.

In one embodiment, the garment is a sanitary napkin intended to be worn against the body of an adult woman as shown in FIG. 6, which shows a meshed sanitary napkin garment. In most cases the sanitary napkin is worn inside the undergarment, such as elasticized panties. Therefore, in one embodiment of the present invention, the garment can actually be a garment system comprised of two or more garments interacting during wear. For example, certain sports equipment, such as shoulder pads and jerseys can be analyzed for fit and comfort as a multiple garment system. Likewise, the interaction between shoes and socks can be analyzed.

The garment can be comprised of more than one structural component, and each component can be created as a separate part and meshed independently. This enables individual material properties to be assigned to each component. For example, a woman's undergarment can have at least three components: the overall panty fabric, the crotch fabric, and the elastic strands. Each of these components can be created as separate parts with individualized material properties appropriate for each material. The material properties can be revised by the user as necessary for different garments.

The garment can be modeled in various initial states, such as in a relaxed, undeformed state, or in a non-relaxed or deformed state. For example, a sanitary napkin can be initially modeled in a generally flat, undeformed initial state, as shown in FIG. 6, or it can be initially modeled in a bunched, folded state. In one embodiment, a garment is initially modeled by having the fewest number of components initially stressed. For example, sanitary napkin can be modeled in a flat-out, undeformed configuration.

Predetermined fixed points on the meshed garment, or garment system, can be identified, the fixed points being fixed in space or with respect to the meshed body during fit analysis according to the present invention. In general, the fixed points can be a maximum distance from the deformable volume of the meshed body.

The fixed points aid in the garment being "applied" to the meshed body by using motion curves to prescribe motion to the fixed points such that the fixed points are translated from a first initial modeled position to a second fixed position relative to the meshed body. To simulate fit and comfort of the garment and body, respectively, the garment or garment system is first "applied" as described above. At this point, the simulation can calculate stresses and strains associated with fit prior to body motion. By driving motion of the body through the predetermined motion curves of the interfacial surface, dynamic stress-strain calculations on the deformable volume and garment or garment system can be made and correlated with dynamic fit and comfort.

Fit and comfort analysis can be achieved by use of a dynamic stress-strain analyzer, such as, for example, LS-DYNA® (Livermore Software Technology Corporation, Livermore, Calif.), ABAQUS® (ABAQUS Inc., Pawtucket, R.I.), or, ANSYS® (ANSYS Inc., Canonsburg, Pa.). Any desired inputs, such as body mesh motion, garment mesh motion, contact surfaces, garment mesh, and/or body mesh can be inputted to accomplish the analysis. The stress-strain analyzer supplies an output of deformed motion and corresponding forces, such as stress and strain. The forces include forces associated with deforming both the body and the garment. Garment deformation and the magnitude of the forces required to generate the deformation can be correlated to fit and comfort.

Optionally, the simulation output, such as deformations and forces can also be visualized using software such as LS-PREPOST® (Livermore Software Technology Corporation, Livermore, Calif.), Hyperview® (Altair Engineering, Troy, Mich.), Ensight® (Computational Engineering International, Apex, N.C.), or ABAQUS VIEWER® (ABAQUS Inc., Pawtucket, R.I.), for example. Visualization of the garment as the body portion is manipulated can show in visual representation the deformation of the garment. For example, a sanitary napkin can undergo buckling, twisting, and bunching during wear. Such deformation is difficult, if not impossible, to watch in real time on a real person due to the practical constraints of such a system. However, such pad fit characteristics can be easily visualized and manipulated in the computer simulation. This capability significantly reduces the time and expense of designing better fitting garments such as sanitary napkins. Properties of materials can be changed as desired and inputted through the dynamic stress-strain analyzer to change the characteristics of the garment, thereby providing for virtual prototyping of various designs.

In some cases, simulations that limit the scope of the product or body to be modeled can be used for increasing efficiencies in analysis. In such cases, only the desired portion(s) of the desired body model or garment are considered in analysis. By limiting the number of simulated elements required to study in a virtual model a desired component or component behavior, a reduction is made of calculations of deformation, stresses, and strains within the model, in addition to reducing the calculations required in interaction amongst portions of the model, for example, contact interactions.

It is well understood in the art that limiting such calculations both increases simulation speed and improves simulation robustness. Examples of this technique include modeling only an air bag in air bag deployment simulations, or modeling only an artery and artery stent when considering the modeling of such devices.

Figure 7:
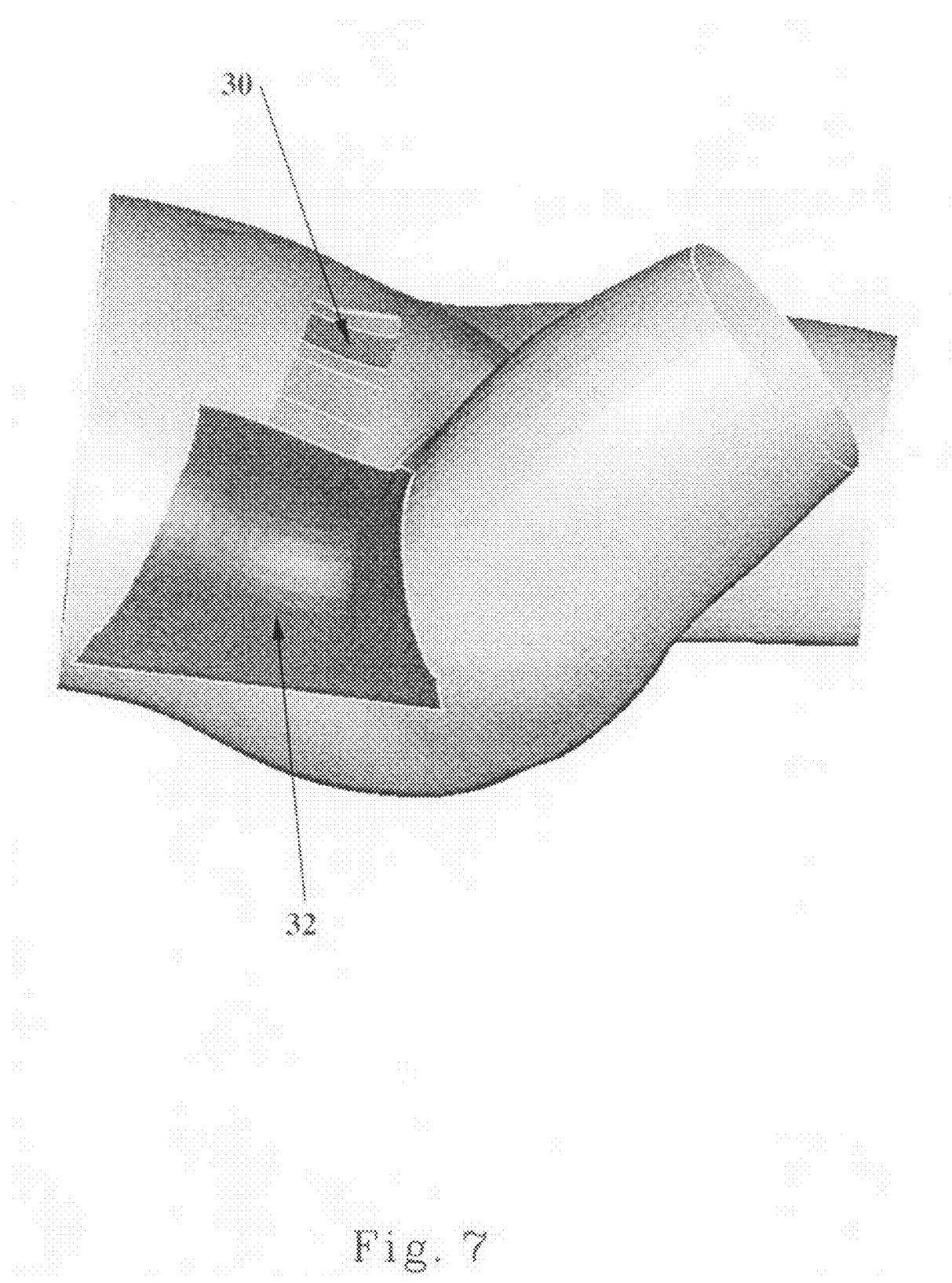
FIG. 7 is a depiction of a portion of a body and an elastic tab of a diaper.

In another example, a simulation may be limited to only a fastener for an absorbent article, such as a tape tab or hook and loop fastener 30 connected to an elastic member 32 (commonly referred to as a diaper ear) against a body, as shown in FIG. 7. In one embodiment, the elastic member(s) 32 can be modeled as a series of solid elements or a shell.

Figure 8:
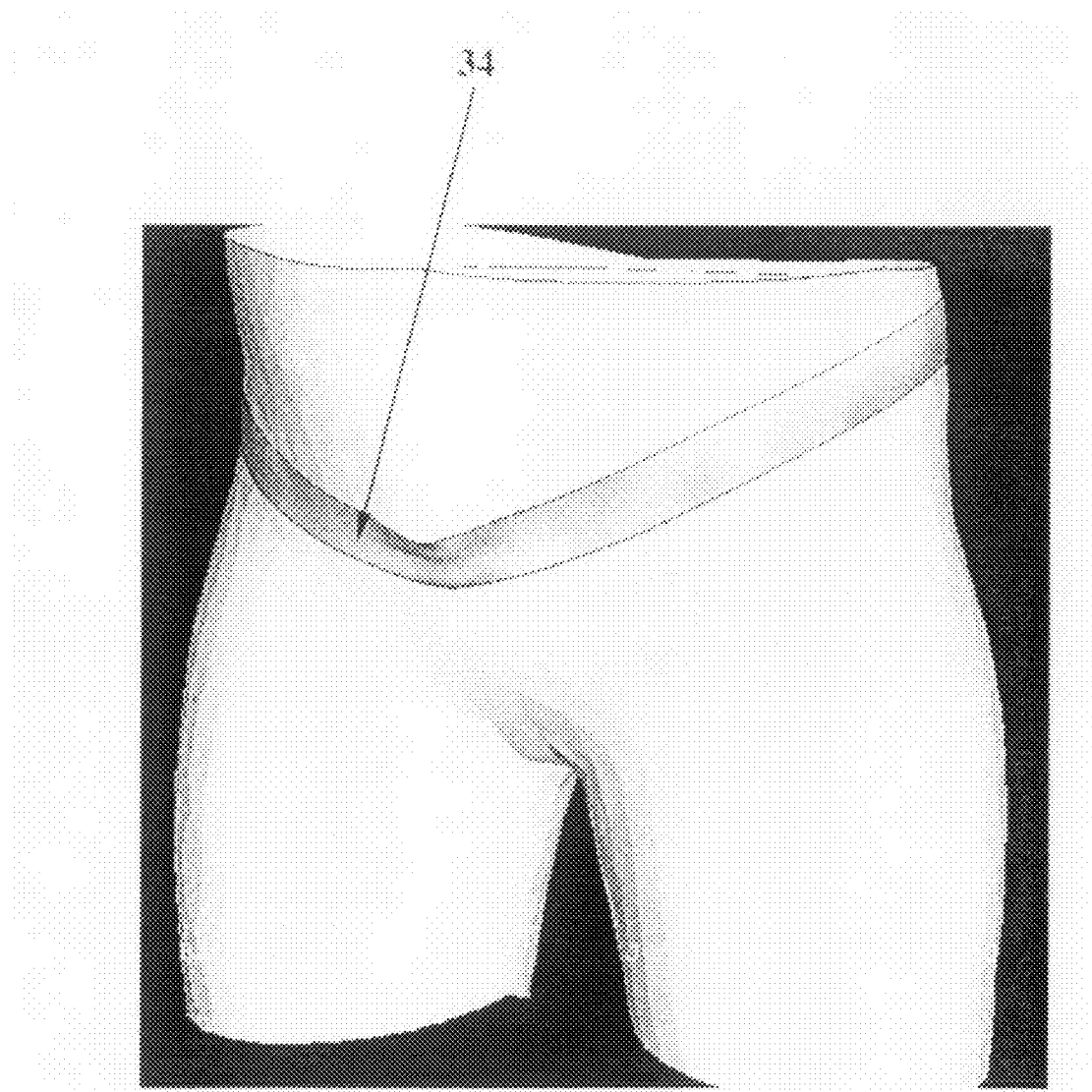
FIG. 8 is a depiction of a portion of a body and an elastic waistband of an absorbent article.

In another example, a simulation may be limited to only a garment waistband, such as diaper waistband 34 shown in FIG. 8. Such a simulation could model applied forces to simulate the interactions from the waist band, including forces due to the loaded absorbent core of the diaper or dynamic motion of the baby displacing the hoop in downward direction.

A model of a portion of the body and product offers the advantage of being computationally efficient to iterate. A computational design of experiments can be used. A computational design of experiments is a set of design iterations that vary the design variables in such a way as to explore the main effects and interactions that explain feature functional performance. For efficiency, space filling designs can be used. One such embodiment utilizing a space filling design is a Latin hyper cube design. The results of a design of experiments can be used to create a response surface, which can be a mathematical function relating the design variables to the feature functional performance. An optimization algorithm can be used to explore the response surface to find optimal or near optimal combinations of design variables that satisfy product constraints and feature functional performance. One such algorithm is shown in Thomas J. Santner, Brian J. Williams, William I. Notz, "Design and Analysis of Computer Experiments", ISBN: 0-387-94520-1.

Figure 9:
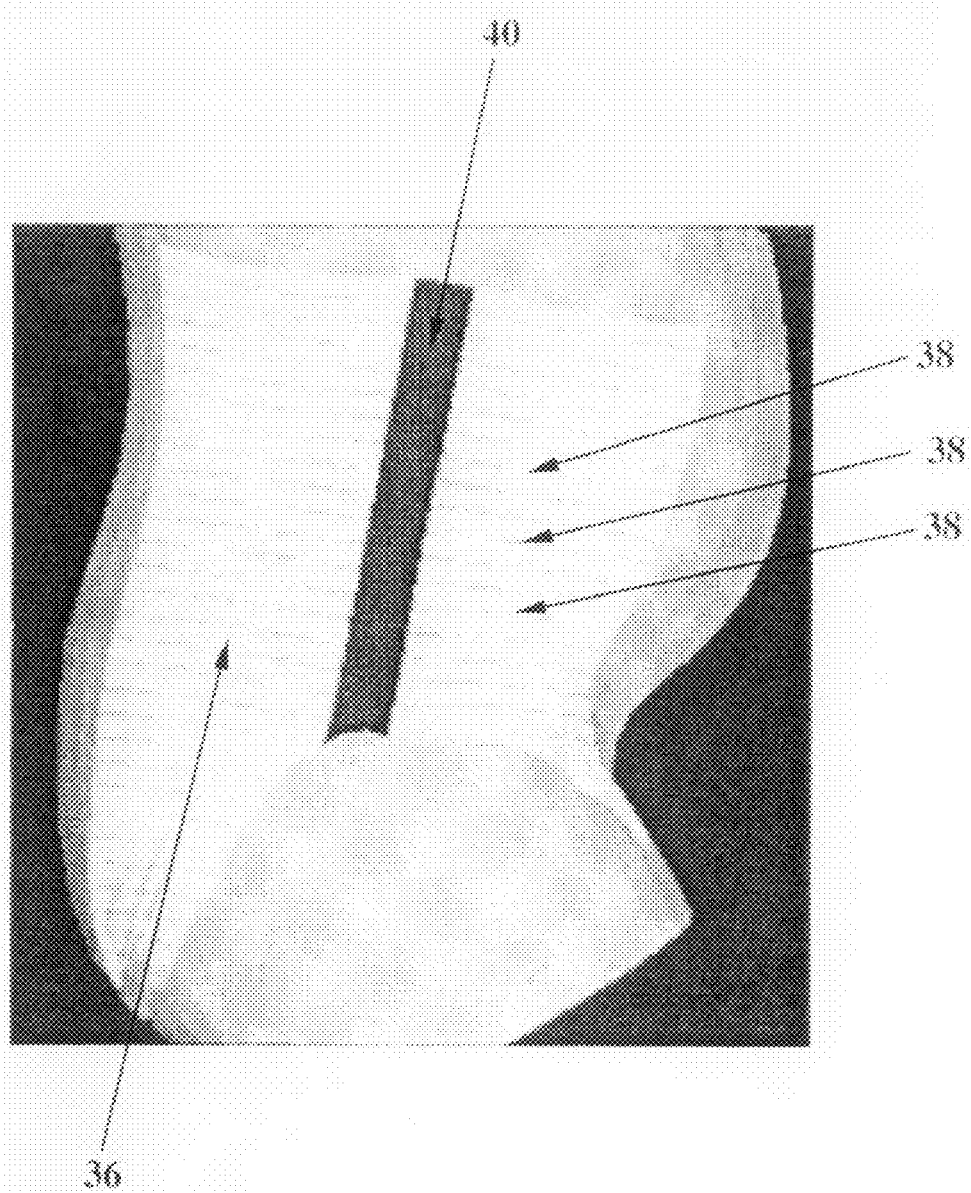
FIG. 9 is a depiction of a portion of a body and an elastic side panel of an absorbent article.

Computational designs of experiments can by used to model products for comfort. An example of such a product is shown in FIG. 9, where multiple stranded elastics 38 laminated within non-woven panels 36 are bonded together with a seam 40, and applied to a body so as to study the impact of elastic strand spacing and force on fit to a virtual body. Pressure on the soft tissue, which in turn is a predictor of comfort of the baby, is a function of elastic strand design variables such as strand width and thickness explained by a response surface. This mathematical function is then used in an optimization routine to determine a range of desired design variables that satisfy comfort requirements, within the constraints of other product performance requirements.

Figure 10:
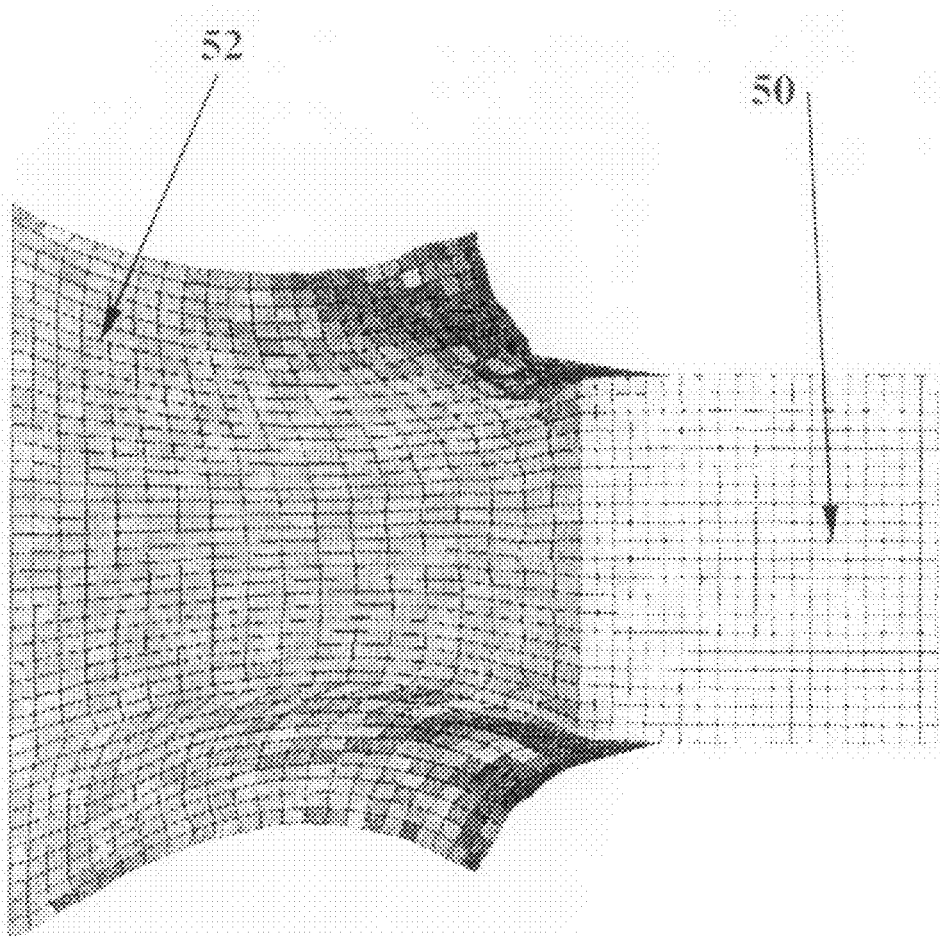
FIG. 10 is a model representation of an elastic fastening tab for an absorbent article.

In another simulation, one could consider the absence of a body sub-model entirely. In such a case, a product, such as a baby diaper or a portion of a baby diaper could be modeled, such as by simulated stretch in space, in the absence of a body. For example, an elastic ear portion of a disposable diaper is shown in stretch simulation in FIG. 10. As shown, a tape tab or hook and loop fastener 50 can be connected to an elastic member 52 and simulated in lateral stretch. Further, analysis can be performed on such component models and correlated to consumer results. For example, the results from the stretch simulation of an elastic ear portion shown in FIG. 10 can be analyzed for stress distribution in the ear and correlated to comfort or red marking of the skin. Likewise, the amount of out-of-plane bending of the elastic member 52, can be minimized to improve aesthetic appearance.

For some products, it is desirable that the heat flux between a garment and a body be modeled, in addition to the fit of the garment to the body. Such products can include ice packs, heat packs, and thermal wraps. For example, thermal wraps, including such products as ThermaCare® thermal wraps from The Procter & Gamble Co., or instant heat packs (disposable), such as infant heel warmers available from The Kimberly-Clark Co. can be worn on the body. In this example, by simulating the heat flux between a thermal wrap and the body by known heat flux models, the effectiveness of the product can be maximized for both fit and heating effectiveness. In addition to the fit modeling process described above, additional information related to known heat flux models can be added to the model including information such as density, initial temperature, heat capacity, heat generation, and thermal conductivity.

In one embodiment, a model can be built in LS-DYNA for the purposes of simulating both product fit and heat flux. Several additional cards, as the term is known in the art, specifically related to heat flux are required for additionally including heat flux by known models. These additional cards can include a *CONTROL_SOLUTION, *CONTROL_THERMAL_SOLVER and *CONTROL_THERMAL_TIMESTEP to activate and control the thermal solver; *MAT_THERMAL_ISOTROPIC to define the thermal properties of the material; *CONTACT_SURFACE_TO_SURFACE_THERMAL to transfer heat between parts in contact (i.e. body and wrap); *LOAD_THERMAL_CONSTANT to prescribe a constant core body temperature; *BOUNDARY_CONVECTION_SET to model the heat transferred to the atmosphere; and *LOAD_HEAT_GENERATION to describe the heat generation time history of the product. One skilled in the art will recognize that the software provides documentation on the need to supply problem specific information within these cards, and one skilled in the art would further recognize the variety of well-published approaches for measuring, calculating, referencing, and/or researching values that can reasonably be used in these cards for the purposes of heat flux modeling.

In some cases, a method to analyze comfort of an actual product on an actual body by use of a virtual model is desirable. Consumers desire products worn on a body that both fit to the body, and are comfortable to wear. In some cases, consumers are not able to indicate their comfort level directly, such as infants. Therefore, the idea of comfort also extends into analyzing other parameters or indicators of comfort, such as the presence of red marks from elastic bands.

Post-processing software, for example ABAQUS CAE (ABAQUS Inc., Pawtucket, R.I.), LSPrePost (Livermore Software Technology Corporation, Livermore Calif.), Hyperview (Altair Engineering, Troy, Mich.), and EnSight (Computational Engineering International, Apex, N.C.), are well known in the art for their ability to read in the results from a model and analyze the results by capabilities programmed into the post-processing software. Examples of capabilities programmed into the post-processing software include the ability to plot stress, strain, pressure, force, and a variety of other outputs. Applying any existing capability programmed into a post-processing software to at least one or more of the parts contained in a single model is trivial. However, in understanding consumer comfort from products fitting against a body, we have learned that the capabilities programmed into the post-processing software are insufficient to provide a metric for comfort. Therefore, to better provide a metric for comfort from a virtual model of a product, a method is required to understand a relative stress, or residual stress that is induced when a product is worn on a body relative to another state in the absence of at least a portion of the product on a body.

Figure 11:
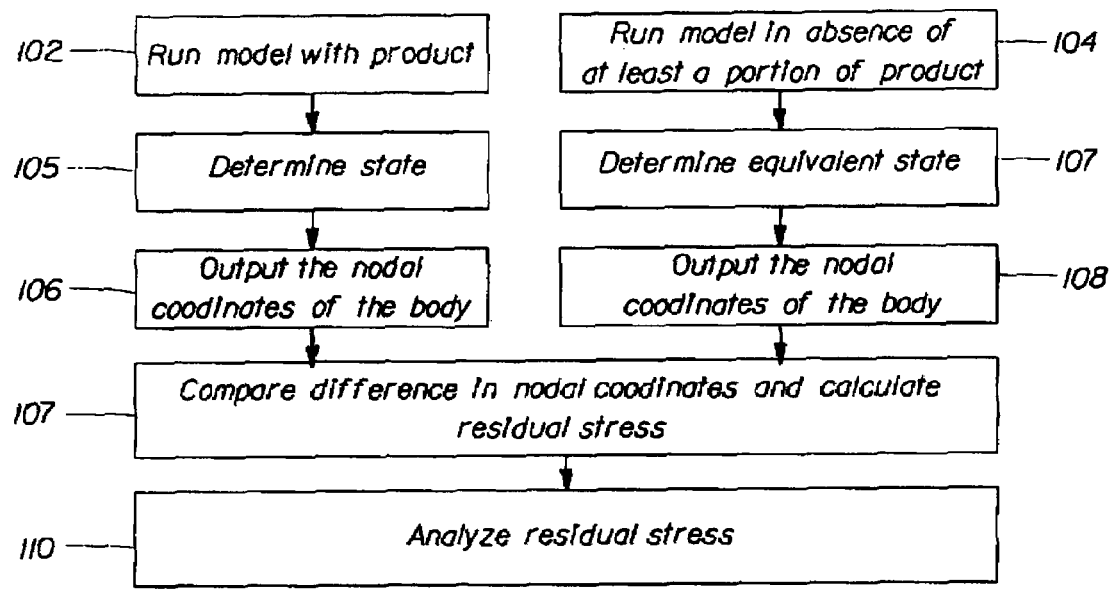
FIG. 11 is a flowchart for model simulation for comfort.

A method for analyzing the comfort of an actual product on an actual body by use of a virtual product model and virtual body model to calculate a comfort indicator is provided in FIG. 11.

A first model is run of a product worn on a body, step 102. This model can be in accordance with that disclosed in U.S. Pat. No. 6,810,300, issued Oct. 26, 2004 to Woltman et al. This product can include disposable products that are worn on a body, such as a diaper, sanitary napkin, or thermal wrap, but additionally the product can be any product to be worn on the body in which it is desirable to be able to model fit and comfort.

A second model is run in the absence of at least a portion of the same product, step 104. Most desirably, the portion of the product that comes in close proximity to the body is removed. In one example of modeling a sanitary napkin, one can remove the entire sanitary napkin when constructing and running the second model at step 104, but retain a virtual body and virtual undergarment the first model at step 102. In this manner, the impact of the elastics of an undergarment and the stress that these elastics create on a body are effectively considered in both the condition with the product and the condition in the absence of the product, and thus, these elastics do not directly contribute to any residual stress on the body.

When the first model is finished running, a state of the first model is defined in step 105. The nodal coordinates for the body in the first model are output at this defined state in step 106.

A state equivalent to the first model is determined in the second model in step 107. An equivalent state refers to the body being in approximately the same position in the second model as it is in the defined state from the first model as defined in step 105. The nodal coordinates for the body in the second model are output at this equivalent state in step 108.

The nodal coordinates for the body output from the first model are compared to the nodal coordinates for the body output from the second model, and residual stress can be calculated in step 110. Residual stress can be calculated from the change in nodal positions by a variety of means including, but not limited to, manual calculation, a C++ program, a FORTRAN program, by implementing additional capability within a post-processor to perform such calculations. Another means for calculating residual stress is to generate a third model containing at least the geometry, section, and material property data of the virtual body, and use a simulation analysis program such as LS-DYNA to calculate the residual stress. LS-DYNA allows for a model to provide two sets of nodal coordinates in two different locations in space. The first set of nodal coordinates are provided via a *INITIAL_FOAM_REFERECE_GEOMETRY card, as is known in the art. The second set of nodal coordinates are provided via a *NODE card. Those skilled in the art will recognize the software supplier provides documentation for the use of such cards, including, for example, the need to maintain consistency in node numbers between the two cards, and the ability to use such a card for a range of material models well beyond just foam materials. Using LS-DYNA, when a model is properly defined with both a *NODE and *INITIAL_FOAM_REFERENCE_GEOMETRY card as outlined in the operational documentation, the software, using information on material properties provided, will calculate the stress induced in the difference in nodal coordinates between the two cards. In some cases, it is necessary to actually run the third model at least briefly to generate these results. In general, it is suggested that the nodal coordinates from the first model are used in the *NODE card, and the nodal coordinated from the second model are used in the *INITIAL_FOAM_REFERENCE_GEOMETRY card.

The residual stress can be analyzed, and interpreted or correlated with consumer response. In one such embodiment, the results from the third model that was run in LS-DYNA can be read into LsPrePost. In this example, results in the initial condition of this third model provide the desired information on residual stress for analysis of comfort from the first and second models.

Several equivalent variations are already known for this approach. One such variation is to replace the use of nodal coordinates in this method instead with stress values, strain values, element deformation, pressure, forces, or any other quantity that can be output from the first and second model, and perform the residual method of calculating the difference from such a quantity instead of the nodal coordinates.

Another variation is that any number of other quantities could be analyzed including strain, pressure, force, and the like. Currently, stress, more specifically first principal stress, has been found to be the preferred measurement.

Another variation is considering correlating comfort to perceived customer comfort, desired purchasing intent of a product, or overall product experience satisfaction. This can naturally be to a single person or to a population of people. In developing such correlations, it could be desirable to further analyze the results of this method by developing average stress/strain maps over the population of bodies for a particular product, computing differences in the distribution of stress/strain for various products on the same body, defining locations, (absolute, mean over all bodies or relative to other products) of maximum and minimum stress/strain points or contours, locating areas of maximum or minimum rates of changes in stress/strain relationship and other parameters that quantify the relationship between the stress/strain and perceived comfort.

The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for calculating a comfort indicator for an actual product on an actual body by use of a virtual product model and virtual body model, said method comprising the steps of:
   a. providing a computer readable memory device containing data and instructions for modeling a virtual body model having an interfacial surface defining a deformable volume;
   b. providing a computer readable memory device containing data and instructions for modeling a virtual product model of an absorbent article;
   c. providing virtual simulation software;
   d. gathering data from actual users of an actual product of a type modeled by said virtual product model;
   e. running a virtual simulation for said virtual product model worn on said virtual body model, wherein the virtual body model is in motion;
   f. measuring stress or strain to determine deformation of the virtual body model deformable volume;
   g. running a virtual simulation for said virtual body model in the absence of said virtual product model, wherein the virtual body model is in motion;
   h. measuring stress or strain to determine deformation of the virtual body model deformable volume;
   i. calculating a difference in deformation on said virtual body model deformable volume between said virtual simulations;
   j. correlating said calculated difference to said gathered data to determine a magnitude difference, said magnitude difference being the comfort indicator.

2. The method of claim 1, further comprising a step of simulating physical deformation of at least a portion of garment.

3. The method of claim 1, wherein said virtual body model deformable volume comprises a plurality of regions identified by material property, and said regions can differ in material property.

4. The method of claim 1, wherein said absorbent article is a sanitary napkin or diaper.

5. The method of claim 1, wherein said correlation is analyzed as stresses in the body.

6. A computer-implemented system for analyzing the comfort of an actual product on an actual body by use of a virtual product model and virtual body model to calculate a comfort indicator, said system comprising:
   a. a computer readable memory device containing data and instructions for modeling a virtual product model of an absorbent article on a virtual body model having an interfacial surface defining a deformable volume, wherein the virtual body model is in motion, and simulating stress or strain on said virtual body model;
   b. a computer readable memory device containing data and instructions for modeling said virtual body model having an interfacial surface defining a deformable volume, wherein the virtual body model is in motion, in the absence of said virtual product model and simulating stress or strain on said virtual body model;
   c. a means for measuring the stress or strain to determine the deformation of said virtual body model deformable volume;
   d. a means for calculating a difference in deformation on said virtual body model deformable volume between said virtual simulations; and,
   e. a means for correlating said calculated difference to determine a magnitude difference, said magnitude difference being the comfort indicator.

7. The computer-implemented system of claim 6, further comprising means for simulating physical deformation of at least a portion of garment.

8. The computer-implemented system of claim 6, wherein said absorbent article is a sanitary napkin or a diaper.

9. The computer-implemented system of claim 6, wherein said correlation is analyzed as stresses in the body.

* * * * *